3,488,345
SUBSTITUTED HEXAHYDRO-1,5-
BENZODIAZOCINES
Francis J. Petracek, Agoura, Calif., assignor to Dart
Industries Inc., Los Angeles, Calif., a corporation of
Delaware
No Drawing. Filed Apr. 27, 1967, Ser. No. 634,098
Int. Cl. C07d *53/00;* C07c *103/74;* A61k *27/00*
U.S. Cl. 260—239          2 Claims

ABSTRACT OF THE DISCLOSURE

This invention is directed to 5-lower alkyl-1,2,3,4,5,6-hexahydro-1,5-benzodiazocines bearing a phenyl group at the 1-position. Such compounds are pharmacologically useful as agents for lowering blood pressure.

---

This invention relates to compositions of matter classified in the art of chemistry as substituted benzodiazocines.

The invention sought to be patented resides in the concept of a chemical compound having a molecular structure wherein there is attached to the nitrogen atom at the 1-position of the 1,2,3,4,5,6-hexahydro-1,5-benzodiazocine nucleus an m-chlorophenyl substituent and to the nitrogen atom at the 5-position a lower alkyl group, and to the hereinafter described equivalents thereof.

As used throughout the application, the term "lower alkyl" embraces both straight and branched chain alkyl radicals containing from 1 to 6 carbon atoms, for example methyl, ethyl, n-propyl, isopropyl, n-butyl, tert-butyl, n-amyl, sec-amyl, n-hexyl, 2-ethylbutyl, 2,3-dimethylbutyl and the like, and the term "halo" represents chloro, bromo and fluoro.

The tangible embodiments of this invention possess the inherent general physical characteristics of being solid crystalline materials. Elemental analysis and spectral data, taken together with the nature of the starting materials and mode of synthesis, positively confirm the structure of the compounds sought to be patented.

The tangible embodiments of this invention possess the inherent applied use characteristics of being hypotensive agents as evidenced by their capability of producing in the anesthetized normotensive dog, upon administration intravenously at a dose level less than 5% of the intraperitoneal $LD_{50}$, a reduction in blood pressure of at least 20% for a duration of at least 40 minutes.

The manner and process of making and using the invention will now be generally described so as to enable one skilled in the art of chemistry to make and use the same as follows:

The starting materials for the preparation of the tangible embodiments of this invention are lower alkyl esters of appropriately substituted N-phenylanthranilic acid which are known compounds that are readily prepared, for example, as described in Hungarian Pat. 151,163 (Chem. Abs. 60:P13191h), by refluxing a mixture of m-chloroaniline, copper powder, o-chlorobenzoic acid and potassium hydroxide to obtain N-(m-chlorophenyl)anthranilic acid, and then forming the ester by conventional methods.

The following reaction sequence depicts the preparation of the specific 5-methyl-1-(m-chlorophenyl)-1,2,3,4,5,6-hexahydro-1,5-benzodiazocine and is illustrative of the preparation of the tangible embodiments of this invention.

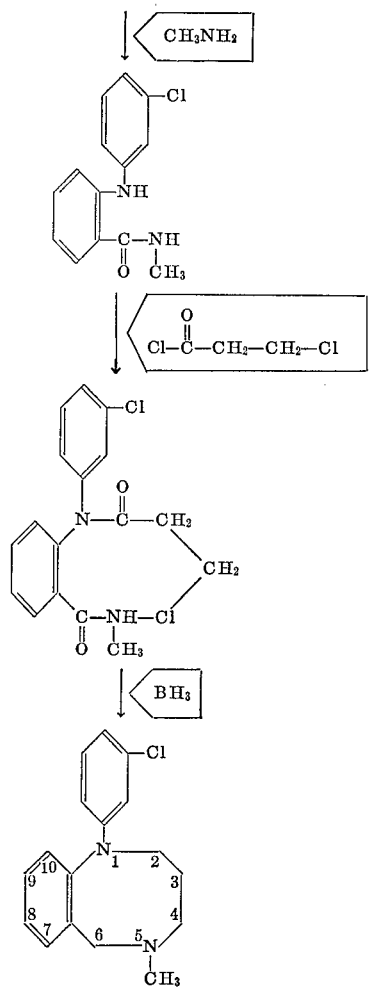

FINAL PRODUCT

According to this reaction sequence, the N-(m-chlorophenyl)anthranilic acid lower alkyl ester is converted to a 2 - (m - chlorophenyl)amino - N - lower alkylbenzamide by treatment at room temperature with an appropriate lower alkylamine in the presence of an inert solvent such as for example, isopropanol. Where the lower alkylamine is a gas at room temperature, as in the case of methylamine, or boils at room temperature, as in the case of ethylamine, the reaction is preferably carried out under pressure in a closed vessel. The product of the reaction is recovered from the reaction mixture by conventional means and, if desired, may be used without further purification.

The benzamide intermediate, thus formed, is then treated with 3-halo-propionylhalide at reflux temperature in the presence of an inert solvent such as, for example, benzene to yield a 2-[N-(m-chlorophenyl)-N-(3-halopropionyl)amino]-N-lower alkylbenzamide intermediate that is used in the next step of the reaction sequence without further purification.

Ring closure and formation of the 1-(m-chlorophenyl)-5 - lower alkyl - 1,2,3,4,5,6 - hexahydro - 1,5 - benzodiazocine final product is accomplished by subjecting the 2 - [N - (m - chlorophenyl) - N - (3 - halopropionyl)amino] - N - lower alkylbenzamide intermediate to a diborane reduction in the presence of an inert organic solvent such as, for example, tetrahydrofuran and at the reflux temperature of the solvent used. During the course of this reaction a certain amount of cleavage occurs, with removal of the propionyl function from the intermediate, resulting in the formation of a secondary amine by-product. The reaction mixture is treated with acetic anhydride to acetylate this secondary amine by-product which is easily separated from the desired 1-(m-chlorophenyl)-5-lower alkyl - 1,2,3,4,5,6 - hexahydro - 1,5 - benzodiazocine final product by conventional methods. The final product is then purified and converted, if desired, into one of its acid-addition salts.

In the above-described reaction sequence, the nature of the lower alkyl substituent at 5-position of 1-(m-chlorophenyl) - 1,2,3,4,5,6 - hexahydro - 1,5 - benzodiazocine is determined by the nature of the particular lower alkylamine used in the first step of the sequence. Thus, methylamine is used to prepare the 5-methyl-substituted final product, ethylamine the 5-ethyl, n-propylamine the 5-n-propyl and the like. Such 5-lower alkyl-substituted final products wherein the lower alkyl substituent is other than methyl have the same utility as, and are the full equivalents of, the specific 5-methyl substituted final product described in the reaction sequence and are included within the scope of the present invention.

The use in the above-described reaction sequence of a starting material having no substituent on the phenyl group, or having the chloro at a position ortho or para to the nitrogen atom to which the phenyl group is attached or where either or both phenyl groups bear one or more halo, lower alkyl, lower alkoxy or trifluoromethyl groups, results in the peparation of final products having corresponding substitution (or lack of substitution) on the phenyl group and/or benzenoid portion of the nucleus as in the starting material. Such final products are the full equivalents of and have the same utility as the specific final products depicted in the reaction sequence.

In addition, the use of a reactant in the second step of the above-described reaction sequence which has a one or a three carbon atom straight alkylene chain separating the terminal

and —Cl groups results in the formation of intermediates which on ring closure as described above yield final products having seven and nine-membered heterocyclic rings forming part of the nucleus, the two nitrogen atoms being separated by 2 and 4 carbon atoms, respectively. Such final products are the full equivalents of and have the same utility as the specific final products depicted in the reaction sequence.

The tangible embodiments of this invention can, if desired, be converted into their non-toxic pharmaceutically acceptable acid-addition and quaternary ammonium salts. Salts which may be formed comprise, for example, salts with inorganic acids such as the hydrochloride, hydrobromide, hydroiodide, sulfate, phosphate or the like. They may also comprise salts with organic acids, including monobasic acids such as the acetate or the propionate, and especially those with hydroxy organic acids and dibasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexylbromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspensions, solutions, suppositories and the like.

The best mode contemplated by the inventors for carrying out the invention will now be set forth as follows:

EXAMPLE (a) 2-(m-chlorophenyl)amino-N-methylbenzamide

N - (m - chlorophenyl)anthranilic acid methyl ester (40 g.), isopropanol (150 ml.) and methylamine (450 ml.) are sealed together in a steel bomb and shaken gently overnight at room temperature. The isopropanol and excess methylamine are removed by evaporation under reduced pressure to yield a brown oil which is dissolved in ether (about 1000 ml.). The ether solution is filtered through "Celite" and then concentrated under reduced pressure to about 100 ml. The amide product is crystallized from ether-petroleum ether in a yield of 36.1 g. (91%), M.P. 89.5–90.5° C.

Analysis.—Calculated for $C_{14}H_{13}N_2OCl$: C, 64.49; H, 5.02; N, 10.75; O, 6.14; Cl, 13.60. Found: C, 64.71; H, 5.05; N, 10.47; O, 6.15; Cl, 13.77.

(b) 2-[N-(m-chlorophenyl)-N-3-chloropropionyl)amino]-N-methylbenzamide

The amide (36. g.), from step (a), is placed into a flask with benzene (800 ml.) and 3-chloropropionyl chloride (36 ml.) and the mixture refluxed for 1 hour with stirring. The benzene is then evaporated under reduced pressure to give an oily residue that is dissolved in chloroform. The chloroform solution is washed twice with cold water, then dilute ammonium hydroxide and then again with water, and finally evaporated under reduced pressure to yield 48.8 g. of a yellow glass. This product is used in the next step of the synthesis without further purification. A small sample was crystallized from benzene for purposes of analysis, M.P. 163°–165° C.

Analysis.—Calculated for $C_{17}H_{16}N_2O_2Cl_2$: C, 58.14; H, 4.59; N, 7.98; Cl, 20.19. Found: C, 58.36; H, 4.77; N, 7.80; Cl, 20.01.

(c) 1-(m-chlorophenyl)-5-methyl-1,2,3,4,5,6-hexahydro-1,5-benzodiazocine

The diamide (48.8 g.), from step (b), in dry tetrahydrofuran (1000 ml.) is purged with nitrogen and then cooled on an ice bath. Into the cold solution is then introduced diborane in tetrahydrofuran (750 ml.) and the temperature allowed to rise to room temperature. The solution is then refluxed for 24 hours followed by cooling back to room temperature. 6 N hydrochloric acid (500 ml.) is added dropwise and the tetrahydrofuran then removed by distillation. Into the aqueous residue remaining is then carefully added 50% sodium hydroxide (400 ml.) and the resulting solution is twice extracted with ether (500 ml. portions). The ether extracts are combined, washed three times with water, dried over anhydrous sodium sulfate and then evaporated under reduced pressure to yield 58.6 g. of a light yellow oil. The oil is heated on the steam bath with acetic anhydride (250 ml.) for 30 minutes and the acetic anhydride then evaporated in vacuo to give an oil that is partitioned between ether and 5% sodium bicarbonate solution. The ether layer is separated, washed with water. The product is extracted with 1 N hydrochloric acid (3 times, 100 ml.). The combined extracts are basified with 6 N, sodium hydroxide and evaporated in vacuo to yield 16.3 g. of light yellow oil. The product is characterized in the form of its fumaric acid salt, M.P. 148°–150° C.

*Analysis.*—Calculated for $C_{21}H_{23}N_2O_4Cl$: C, 62.61; H, 5.75; N, 6.96. Found: C, 62.68; H, 6.39; N, 6.06.

The subject matter which the applicant regards as his invention is particularly pointed out and distinctly claimed as follows.

I claim:
1. 1 - (m - chlorophenyl) - lower alkyl-1,2,3,4,5,6-hexahydro-1,5-benzodiazocine.
2. A compound according to claim 1 wherein said lower alkyl group is methyl.

References Cited

FOREIGN PATENTS 3,434   7/1965   France.

ALTON D. ROLLINS, Primary Examiner

U.S. Cl. X.R.

260—558, 562; 424—244

PO-1050
(5/69)

UNITED STATES PATENT OFFICE
CERTIFICATE OF CORRECTION

Patent No. 3,488,345     Dated January 6, 1970

Inventor(s) Francis J. Petracek

It is certified that error appears in the above-identified patent and that said Letters Patent are hereby corrected as shown below:

In the claims:

Claim 1 should read:

-- 1-(m-chlorophenyl)-5-lower alkyl-1,2,3,4,5,6-hexahydro-1,5-benzodiazocine --

SIGNED AND
SEALED
JUN 16 1970

(SEAL)
Attest:

Edward M. Fletcher, Jr.
Attesting Officer

WILLIAM E. SCHUYLER, JR.
Commissioner of Patents